F. J. WOOD.
THRESHING MACHINE.
APPLICATION FILED OCT. 24, 1919.
1,397,347.
Patented Nov. 15, 1921.
2 SHEETS—SHEET 1.
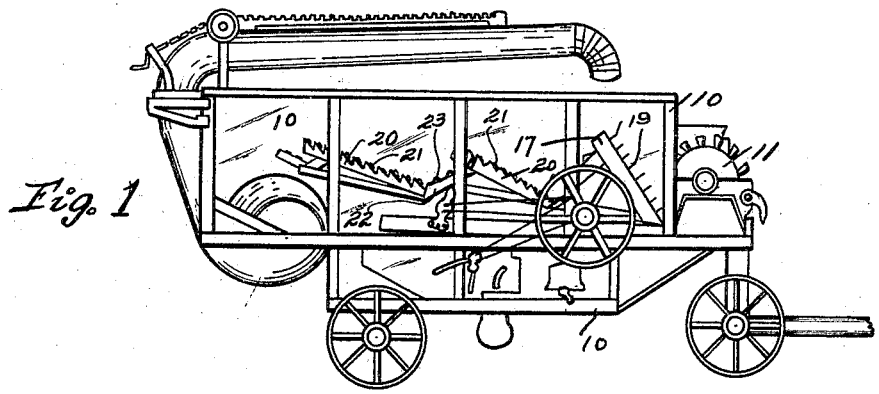
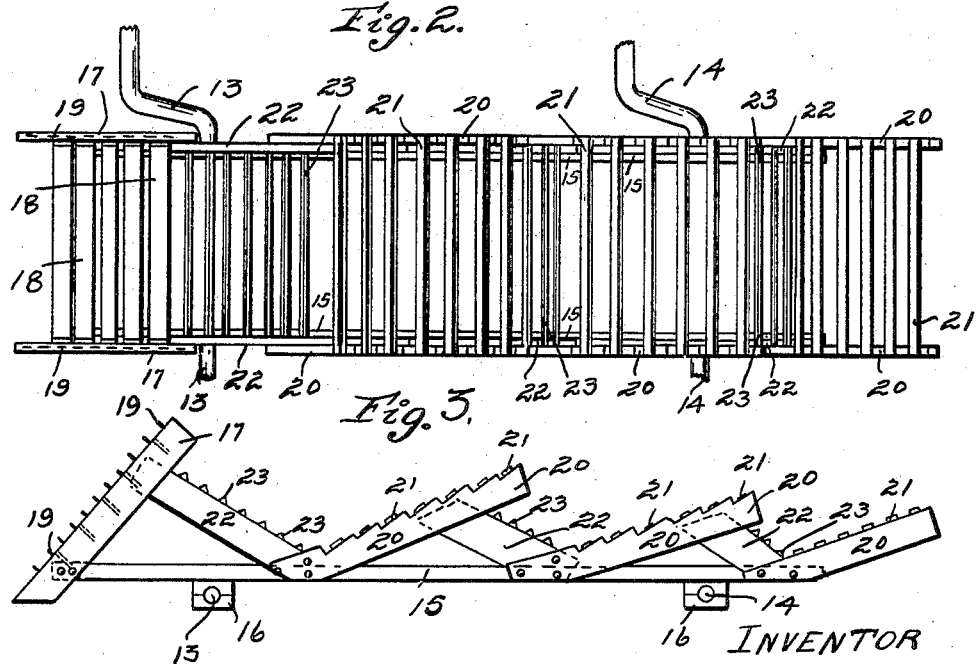

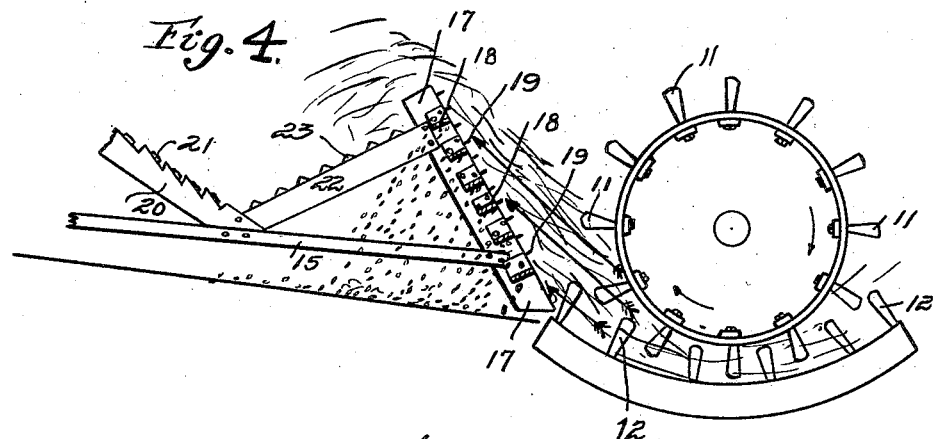
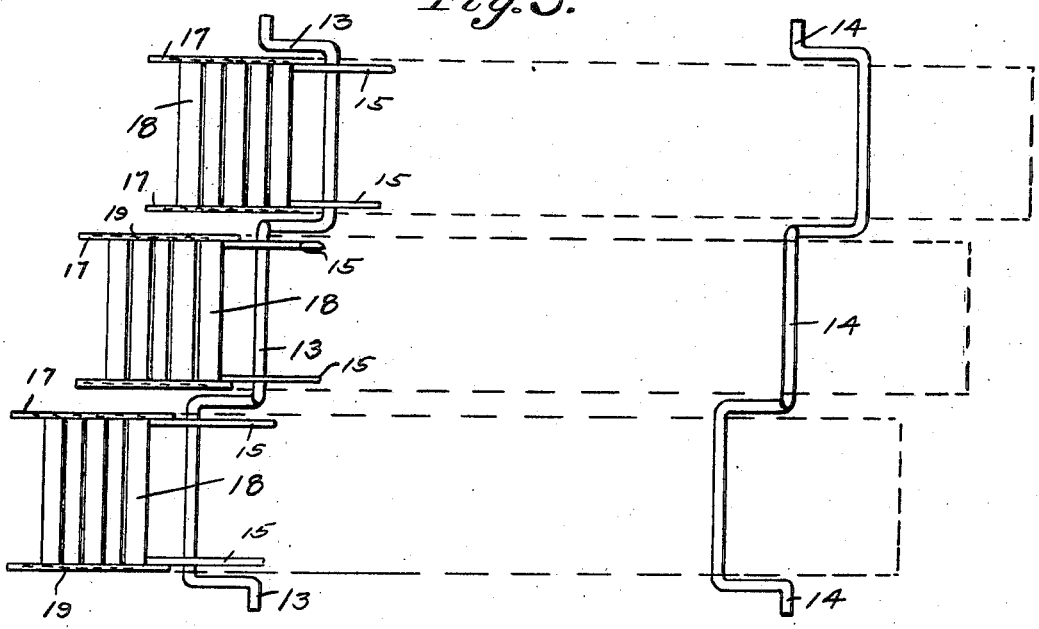

UNITED STATES PATENT OFFICE.

FRANZ J. WOOD, OF DES MOINES, IOWA.

THRESHING-MACHINE.

1,397,347.             Specification of Letters Patent.        Patented Nov. 15, 1921.

Application filed October 24, 1919. Serial No. 333,081.

*To all whom it may concern:*

Be it known that I, FRANZ J. WOOD, a citizen of the United States, and resident of Des Moines, in the county of Polk and State of Iowa, have invented a certain new and useful Threshing-Machine, of which the following is a specification.

In the threshing machines now in general use, the grain is fed between the cylinder and concave, and the kernels are released from the straw and then the entire mass of straw and kernels is delivered on top of shaking pans of various kinds, the function of which is to shake the mass to such an extent as to cause the loosened kernels to work their way downwardly through the straw to the grain pans beneath the shaking pans. In threshing machines of this character it has been necessary to provide very large shaking pans, because the process of separation was very slow and the mass of straw and grain had to travel over a considerable area of shaking pans before a satisfactory percentage of the kernels became separated from the straw.

The object of my invention is to take advantage of the fact that in a threshing machine the straw and kernels, as they are discharged from between the cylinder and concave, are thrown violently upwardly and rearwardly and the straw is not massed, so that the kernels may travel through the straw, and I take advantage of this condition by interposing in the path of the straw and kernels being thrown from between the cylinder and concave, a series of deflector plates so positioned that the kernels will strike upon their under surfaces and will then rebound and be deflected downwardly through and between the deflector plates so that the large percentage of the kernels will immediately pass to the grain pans and be separated from the straw before the straw and kernels are delivered to the shaking pans.

A further object is to provide means in connection with these deflector plates, whereby the straw is kept moving upwardly and rearwardly over the deflector plates and upon shaking pans in the rear thereof.

My invention consists in the construction and arrangement of a threshing machine, of deflector plates arranged in the path of travel of the kernels and straw from the cylinder and concave, so arranged that their under surfaces will be engaged by the kernels and they will rebound or be deflected downwardly through and between the deflector plates, and also to provide means whereby the straw thrown against or adjacent to the front of the deflector plates will be carried upwardly and rearwardly over the deflector plates and upon the shaking pans in the rear thereof, as hereinafter more fully set forth, pointed out in my claims, and illustrated in the accompanying drawings, in which:

Figure 1 shows a side elevation of a threshing machine embodying my invention, with the side boards removed to show the internal construction and arrangement.

Fig. 2 shows a top or plan view of one of the combined deflector plate and shaking pan devices.

Fig. 3 shows a side elevation of same.

Fig. 4 shows a diagram, partly in section, illustrating the relative arrangement of the cylinder and concave and my improved deflector device, and illustrating the manner in which the kernels discharged from the cylinder and concave pass through the straw and strike upon the under surfaces of the deflector plates; and Fig. 5 illustrates, diagrammatically, a top view of the series of deflector plates and shaking pan devices to illustrate means whereby they are successively operated by crank arms on a crank shaft.

Referring to the accompanying drawings, I have used the reference numeral 10 to indicate generally the frame of the threshing machine, and 11 the threshing cylinder, and 12 the concave. All of these parts are of the usual construction and arrangement, except that the frame of the machine is only about half the size of the frame of the ordinary threshing machine now in general use having the same separating capacity.

Mounted in the machine frame are two crank shafts 13 and 14, each having a number of crank arms thereon, extended in different directions from the center of the shaft. On each set of crank arms is a combined grain deflector and shaking pan device.

Each of these devices comprises a frame 15 having bearings 16 to receive a crank shaft. At the forward end of said frame is the grain deflecting device, consisting essentially of two side members 17 extended upwardly and rearwardly, and having supported between them a series of deflector plates 18, these plates being arranged substantially at right angles to the side members 17. At the front edges of the side members 17 are the straw engaging pins 19. When in use these side pieces 17 extend upwardly and rearwardly from a point close to the discharge side of the cylinder and concave, and the deflector plates 18 thereof are so positioned that they will intercept the line of travel of the material being thrown upwardly and rearwardly from between the cylinder and concave, as clearly illustrated in Fig. 4.

In the rear of the deflector device is a shaking pan device indicated generally by the reference numeral 20. This consists of a series of upwardly and rearwardly extending pans having cross pieces 21 thereon, and between them are the downwardly and rearwardly extending racks 22 having cross pieces 23 thereon.

In the illustrations shown in the accompanying drawings, there are three of these combined deflector and separating pan devices, and they are made wide enough to cover the interior of the threshing machine frame, and are reciprocated by the cranks alternately.

In practical use the cylinder is rotated at a high rate of speed, and is provided with teeth, and the concave is also provided with teeth. Grain fed between the cylinder and the concave has the kernels loosened from the straw by the said teeth, and the mass of kernels and straw is then thrown upwardly and rearwardly from between the cylinder and concave. While this mass is traveling upwardly and rearwardly, it is quite loose, and the kernels, being heavier, can pass through the flying mass of straw. Hence, by providing deflector plates so positioned that they will intercept the path of this flying mass of straw and kernels of grain, the kernels of grain will strike upon the under surfaces of these deflector plates and will rebound therefrom and pass through between the various deflector plates and be delivered to the grain pans beneath. The straw, however, will not rebound from the under surfaces of the deflector plates. This is true even if, for instance, a straight straw should be violently thrown so that one end would strike directly upon the under surface of the deflector plate, because it does not have the resiliency of a kernel of grain, and its end making the impact would probably bend over and the body of the straw would be carried up by its momentum or by the current of air in which it is being carried, or by the teeth 19 at the front of the deflector frame, until it was carried over the top of the deflector plate and fell upon the shaking pan in the rear thereof.

By this arrangement I am enabled to make practically the same percentage of separation of the kernels from the straw before the straw passes over the top of the deflector frames, as is ordinarily accomplished at the discharge end of the shaking racks of the class of separators now in common use.

However, with my improved grain separating device it sometimes happens that a kernel of grain will be carried by the straw to a point in the rear of the deflector plates, and I therefore provide short shaking racks for the purpose of getting a still higher degree of separation.

In order to maintain this action of the kernel deflecting plates, for separating the kernels from the straw before they become settled in a mass on top of the shaking racks, it is necessary that the straw be kept from forming in masses upon the front edges of these kernel deflecting plates. Otherwise and in the event that straw should be massed and held thereon, obviously the plates could not function in the manner herein defined. For this purpose I have provided first for imparting an oscillating motion to these frames in which the kernel separating plates are secured, and also I have provided a series of such racks for supporting independent sections of these kernel deflecting plates, so arranged as to be operated intermittently. The one on one side will at times be at its forward limit, while the one on the opposite side will be at its rearward limit, as shown in Fig. 5, and at said time the straw from the threshing cylinder will be thrown rearwardly and laterally toward the side with the plates in their rearmost position. Then when the cranks have made a half turn the relative positions of the plates will be reversed, resulting in the deflection of the straw rearwardly and toward the opposite side, thereby distributing the straw laterally as well as rearwardly.

However, by my improvement I have been enabled to build and use these separators, making the body of the separator approximately half the size of the separators now in common use having substantially the same capacity.

I claim as my invention:

1. In a threshing machine of the class having a cylinder and concave which in operation throw the straw and kernels upwardly and rearwardly, a device for separating the kernels from the straw while they are in the air and during said upward and rearward movement, said device comprising a frame arranged substantially tangential to the delivery end of the concave, and a series of deflector plates supported in said frame, said plates being in direct and uninterrupted communication with the cylinder and concave, and also being widely spaced apart and arranged transversely in the frame and at such angles from front to rear that kernels of grain thrown from the cylinder and concave will strike upon their under surfaces and then rebound rearwardly through the spaces between the plates.

2. In a threshing machine of the class having a cylinder and concave which in operation throw the material upwardly and rearwardly, means for separating the kernels from the straw comprising three frames arranged side by side, there being on each frame a series of deflector plates at the front in direct and uninterrupted communication with the cylinder and concave and a shaking pan at the rear, and a crank device for operating the frames having a crank arm for the central frame and also a crank arm for each side frame, the latter crank arms being extended in opposite directions from the central one, for the purposes stated.

3. In a threshing machine of the class having a cylinder and concave which in operation throw the material upwardly and rearwardly, a series of devices for separating the kernels from the straw and arranged side by side, each comprising a frame, a series of deflector plates at the front of the frame and a shaking pan at the rear, the deflector plates being in direct and uninterrupted communication with the cylinder and concave, and means for moving and shaking said frames, whereby they will alternately, during each operation, assume a position with the forward end of the frame to the left in front and the others progressively spaced rearwardly therefrom and then the one to the right in front and the others progressively spaced rearwardly, for the purposes stated.

Des Moines, Iowa, October 11, 1919.

FRANZ J. WOOD.